United States Patent
Hadani

[11] Patent Number: 4,467,190
[45] Date of Patent: Aug. 21, 1984

[54] NIGHT-VISION EQUIPMENT

[75] Inventor: Yitzhak Hadani, 16 Keren Hayesod St., Romema, Haifa, Israel

[73] Assignee: Yitzhak Hadani, Haifa, Israel

[21] Appl. No.: 316,398

[22] Filed: Oct. 29, 1981

[30] Foreign Application Priority Data

Nov. 2, 1980 [IL] Israel ................................. 61390

[51] Int. Cl.³ ................ G02B 23/02; G02B 23/12; H01J 31/50
[52] U.S. Cl. .......................... 250/213 VT; 350/538
[58] Field of Search ............... 250/213 VT; 313/525, 313/527–528, 532, 542–543; 350/538

[56] References Cited
U.S. PATENT DOCUMENTS 4,076,978 2/1978 Brennan et al. ............ 250/213 VT
4,145,142 3/1979 Mikeman ................ 250/213 VT X Primary Examiner—David C. Nelms
Assistant Examiner—Edward P. Westin
Attorney, Agent, or Firm—Browdy & Neimark

[57] ABSTRACT

A night-vision instrument for presenting a 1:1 image comprises an objective, an image intensifier or converter tube, an ocular, a flat double-sided input mirror, and an optical system adapted to transfer the image appearing on the phosphor screen of the intensifier to the ocular. The ocular axis is in line with the viewed object, while the objective and the intensifier have their axis positioned at a right angle to the viewing axis. The input mirror is positioned in front of the ocular inclined at 45° to its axis and to the axis of the objective, so as to direct the light rays received from the viewed object through the objective onto the cathode of the intensifier. The intensified image appearing on the phosphor screen is directed to the rear side of the input mirror by one single prism, one inclined mirror, one double prism and an optical lens system. The rear side of the input mirror projects the image through the ocular into the eye of the observer. The geometry of the instrument is such that the image of the object appears in the eye under the same visual angle as if viewed from the same distance by the unaided eye, which is obtained by making the distance between the optical center of the input mirror and the eye lens equal to the distance between the said mirror center and the optical center of the objective, and by designing the optical system accordingly.

13 Claims, 5 Drawing Figures

NIGHT-VISION EQUIPMENT

The invention relates to night vision equipment attached to a wearer's head, more particularly to night vision goggles or night vision monoculars.

By night-vision equipment is meant an instrument that converts an object that is practically invisible to the unaided eye, into a visible image, without, however, enlarging it. The main component of such night vision equipment—which may be binocular or monocular—is an image converter or image intensifier tube which serves to intensify an infrared or low-level visible light radiation emitted or reflected by an object, and which essentially comprises a semitransparent photo-emissive cathode situated at its front end, a phosphor screen positioned at its rear end, and an electrostatic lens system inserted between the two. The night-vision instrument further contains an objective, i.e. a lens for projecting the image to be viewed into the photo-emissive cathode, and an ocular i.e. an optical system for viewing the intensified image. The tube in most instruments is provided with an image reversal system, consisting in essence of a bundle of very thin, light-conducting glass fibers one end of which faces the phosphor screen, while the other end faces the ocular, the fiber bundle being twisted in 180°-spirals, thus reversing bottom and top of the picture.

The instrument is advantageously firmly attached to the head of the wearer, so as to permit the free use of his hands; binocular viewing is preferable, because it increases the intensity of perception and enables the wearer to estimate the distance of a viewed object. However, the known instruments have certain drawbacks which will be explained in the following with reference to the diagrammatic drawing of a conventional instrument as shown in FIG. 1.

Herein each of the two parallel viewing paths consists of an objective 1,1', an image converter tube 2,2' and an ocular 3,3'. The image converter tube comprises a photo-emissive cathode 21 facing the objective, a phosphor screen 22 at it rear end, and an electrostatic lens system between the two. An image reversal system 24 is attached to the rear of the phosphor screen, producing a top-side up picture at its end 25 facing the ocular.

The rays issuing from the object viewed are projected by the objective onto the photo cathode 21. The light energy is intensified and a visible image is reproduced on the phosphor screen 22 and reversed by the glass fiber system 24, whereby it appears in the correct, top-side-up position on the rear end surface of the instrument. The image is then projected by the ocular 3 through the eye lens onto the retina. The two viewing paths forming the binocular are of relatively great length which is necessary for the accommodation of its components, and the objective is, therefore, far removed from the eye lens. Accordingly the light rays arriving at the objective from the object viewed therethrough, do not coincide with the light rays reaching the eye lens from the phosphor screen via the ocular but present an image of the object slightly different from that which would be seen by the unaided eye; the eye is thereby deceived with respect to the position of the object and its distance from the observer. Therefore, whenever the observer turns his head to see the entire area ahead of him, the great distance between objective and ocular creates certain discrepancies in his perception of the object and in his estimation of its relative distance from him. The angular movement of the head swings the eyes about a centre M which coincides with the axis of the cervical vertebrae positioned to the rear of the face and the eyes. The visual field, during normal sight without visual aid, beyond ordinary spectacles, is projected onto the retinae without any deviation, as governed by the position of the pupils and the eye lenses. Correct space perception in both static and dynamic fields is, therefore, determined by the movement of the head and the eyeballs only, and orientation in space is a function of these movements and of the so-called movement parallax, which is determined by the distance between the rotary axis of the head (M) and each eye (a in FIG. 1).

When a visual aid, in the form of a binocular, for instance, is attached to the head the relative distances are altered and, as a result, changes occur in the proprioception of the person wearing the binoculars, for the main reason that an angular movement of the head through a given angle causes the image of the surroundings to pass across the retina at a faster pace than without a visual aid. This conflict, ultimately, results in headaches, dizziness, visual fatigue and other nervous disturbances, as the body cannot react in its usual manner to the visual impressions received by the brain.

It is, therefore, an object of the present invention to provide night vision equipment which should cause the direction of the light beams, emanating from an object and falling onto the objective of the equipment to coincide with the direction of the beams passing through the ocular to the pupil and the eye lens of the observer, when no night-vision equipment is worn.

It is another object of the invention to provide night vision equipment capable of being made of very light construction so as to prevent the wearer from being unnecessarily burdened and fatigued.

According to the invention, a night vision instrument adapted to present a 1:1 image of an otherwise barely visible object viewed therethrough, consists of an objective, an image intensifier or converter tube of a known design, an ocular, a flat input mirror and optical means for transferring the image from the phosphor screen of the tube to the ocular; in contradistinction, however, to the existing instruments, the instrument of the present invention is characterized by the spatial arrangement of these components, whereby the objective and the image converter being coaxially positioned in spaced-apart relationship with their common axis at a right angle to the axis of the ocular at a predetermined distance from the intersection of these axis, the input mirror, for its part, being positioned near the front of the ocular, its optical center lying on the ocular axis and its surface inclined with respect to this axis at an angle of 45°, so as to direct the rays incident thereon from the viewed object through the objective onto the photo cathode of the image converter tube. The instrument of the present invention is further characterized by the fact that the distance between the optical center of the main mirror and the eye pupil of the observer equals the distance between the said mirror center and the optical center of the objective; and by the additional fact that the optical means for transferring the image from the phosphor screen of the tube through the ocular is so dimensioned as to cause the image to appear in the eye under the same visual angle as if viewed from the same distance by the unaided eye. A phosphor screen is a device for converting electron beams impinging on its rear face into a visible image appearing on its "ocular"-face.

The image appearing on the phosphor screen can be projected into the eye by a variety of known optical means: one of these consists in a bundle of thin light-conducting fibers of glass or another transparent material positioned between the phosphor screen and the ocular. A preferred embodiment comprises a mirror system of five flat mirrors, in addition to said input mirror, all inclined at 45° to the axis of the ocular as well as to the axis of the image converter, wherein a first deflecting mirror is positioned to the rear of the input mirror which faces the ocular and having its surface parallel to the surface of the main mirror. A rectangular, optical path consisting of a set of four mirrors, each set at a right angle to the mirror at the adjacent corner of the rectangle projects the image appearing on the phosphor screen, onto the said first mirror by reflecting the light through four right angles. A symmetrical biconvex lens is positioned between two adjoining mirrors in order to reverse the image, so as to cause it to appear to the eye in an upright (i.e. top-side-up) position. The lens is not required in case the image converter is provided with a glass-fibre reversal system, but if it is installed it assists in directing the rays at the required visual angle.

Instead of the four mirrors two right-angled double-reflecting prisms may be installed; since, however, low weight is of the utmost importance, mirrors are preferably used, since on the whole, they weigh less than prisms.

In the accompanying drawings

Figure 1:
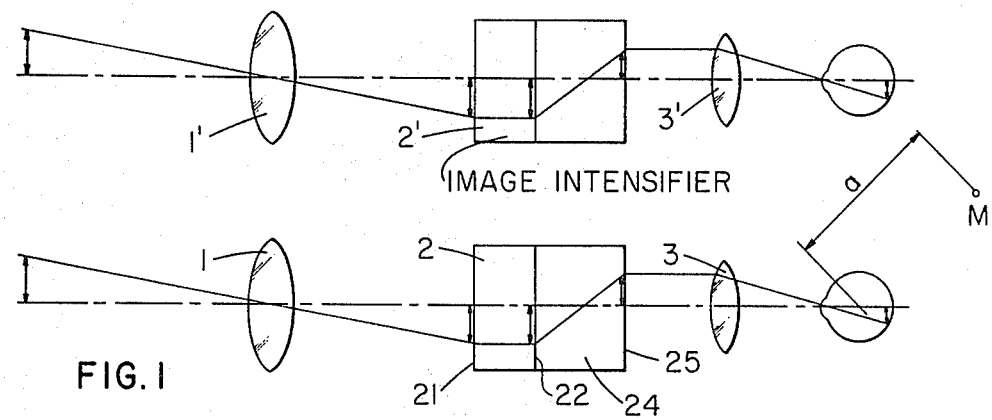
FIG. 1 is a diagrammatic drawing of a conventional night-vision equipment.
Figure 2:
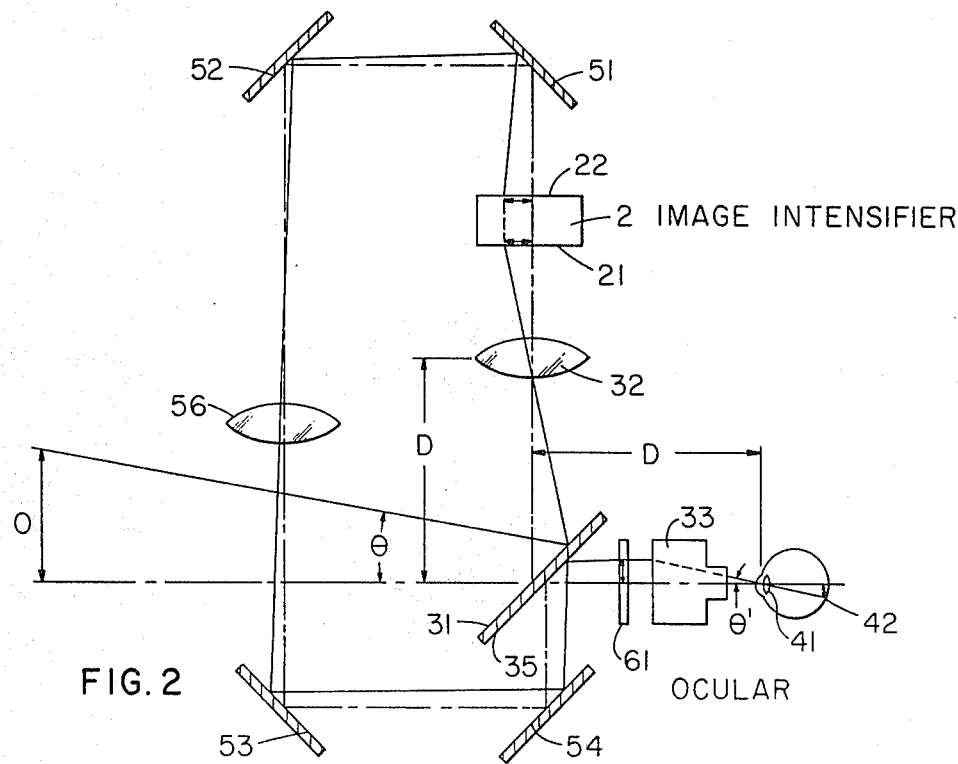
FIG. 2 is a diagrammatic arrangement of one embodiment of an infrared viewer.

FIG. 2 illustrates a diagrammatic arrangement of one embodiment of an infrared viewer, which may form one half of a binocular or may be used as a monocular instrument. The instrument comprises an infrared image converter or low-level light intensifier 2 positioned at a right angle to the viewing axis of the instrument as defined by the axis of an ocular 33, and at a predetermined distance therefrom, which will be more closely defined herein. The image converter consists of a photo-emissive cathode 21 situated at its front, a phosphor screen 22 at its rear, and an electrostatic lens system interposed between the two which serves to convert a nearly invisible image projected onto the cathode into a visible image appearing on the phosphor screen. In contradistinction to the conventional arrangement of the image converter illustrated in FIG. 1, no reversing system (24) is incorporated in the present embodiment, for reasons that will be apparent in the following. An objective lens 32 is provided in front of the photo cathode coaxial therewith and at a relatively short distance therefrom. The rays given off by an object O are reflected by a flat input mirror 31 into the objective 32, the mirror being centrally positioned in the viewing axis of the instrument and inclined thereto at an angle of 45'. The geometrical disposition of the objective and the main mirror is characterized by the centre of the input mirror being equidistant from both the optical centre of the objective and the eye lens 41, this distance being marked "D". The obverse side of the mirror 31 is shaped to form a mirror surface 35 parallel with the front surface and likewise centered on the viewing axis, but facing the ocular 33. The visible image appearing on the phosphor screen 22 is projected into the ocular 33 by means of four flat mirrors 51, 52, 53, 54 and the mirror 35, each of the four mirrors being at an angle of 45° with respect to the viewing axis and at an angle of 90° to each of the two adjacent mirrors, these mirrors thus occupying the four corners of a rectangle. The image is reversed into the top-side-up position by a lens 56 positioned between the mirrors 52 and 53.

A vision diaphragm 61 shown to be positioned in the plane of the intermediate image in front of the ocular is optional and may be omitted.

The ocular, the focus of which lies in the plane of the diaphragm, projects the image into the eye through the eye-lens 41 and onto the retina 42. By following the light rays, it becomes evident that the visual $\theta$ at which the object O as received by the objective 32, is identical with the visual angle $\theta'$ at which the image of the object enters the eye lens 41. The overall geometry of the optical system is designed so as to project the viewed object O into the eye at the same visual angle as that at which it would be seen by the unaided eye from the same distance. In the embodiment illustrated the intermediate image appearing on the vision diaphragm (if fitted) is of the same size at that appearing on the phosphor screen 22 of the tube. This is achieved by placing the lens 56 exactly halfway between the plane of the phosphor screen 22 and the plane of the intermediate image as appearing on the diaphragm 61. The distance between the converter or intensifier tube and the objective lens 32 is given by the maximum visual angle which can be received by the photo cathode 21. The magnification of the ocular is so chosen as to re-produce the object O at the same angle 8 as that at which it would appear to the unaided eye.

Figure 4:
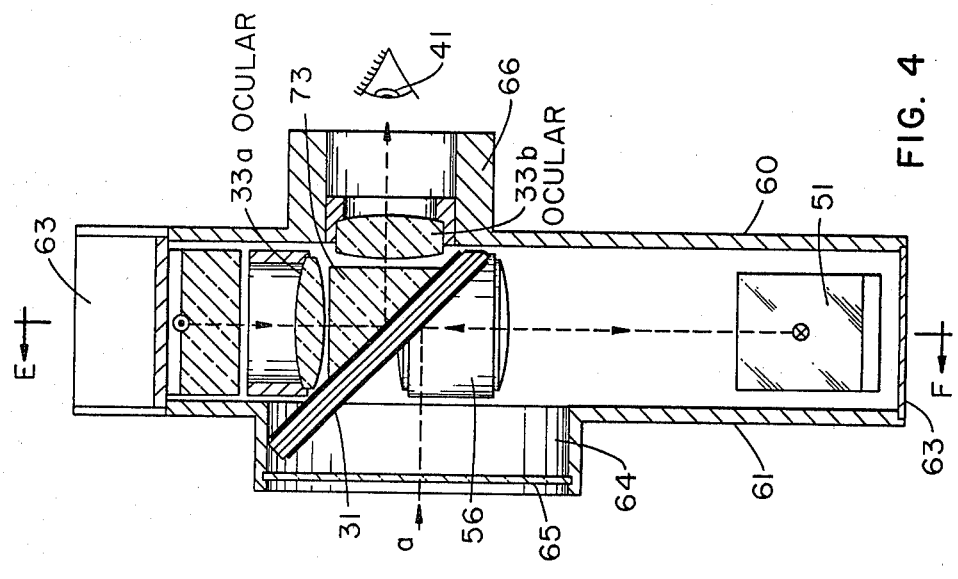
FIG. 4 is a section along A-B-C-D of FIG. 3.
Figure 3:
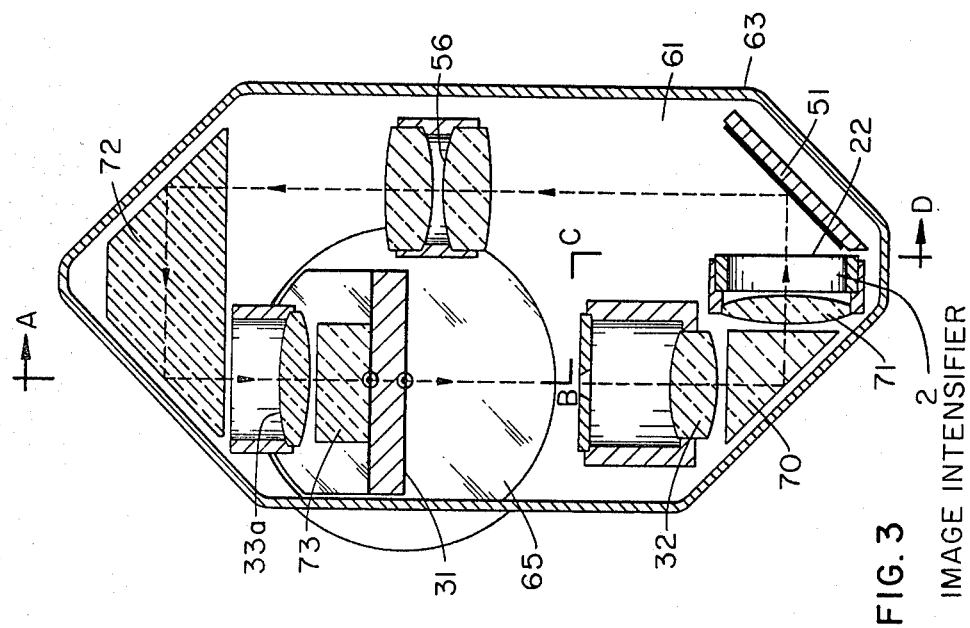
FIG. 3 is a section through another embodiment of an infrared viewer.

FIGS. 3 and 4 illustrate an instrument built in accordance with the diagram of FIG. 2 wherein, however, in order to make the instrument more compact, the optical path from the front surface of the input mirror through the image intensifier to the obverse side of the input mirror lies in a vertical plane that extends perpendicular to the path between the viewed object and the eye.

With a view to facilitate the understanding of this embodiment of the invention, identical reference numerals are used for parts which correspond both in the diagram of FIG. 2 and the actual instrument illustrated in FIGS. 3 and 4. The instrument—which represents one half of a binocular viewer—comprises an outer casing which consists of two substantially flat sides 60 and 61 and of a peripheral cover 63 of an irregular hexagonal cross section. The flat side 61 is provided with a cylindrical viewing opening 64 which is closed by a glass plate 65. The flat side 60 is provided with a cylindrical ocular mounting 66, substantially opposite the viewing opening. The optical components are mounted inside the casing, but in order to show every component clear and unobstructed almost all fixation means have been omitted in the drawing, and only the components themselves are being shown.

Following the light from the viewed object falling into the casing through the glass plate 65, the components are arranged in the following order: The light entering the instrument at "a" is deflected in downward direction into an objective lens 32 by the front surface of an input mirror 31, which is inclined at an angle of 45° to the plane of the casing. The light issuing from the objective is directed into an image converter or intensifier 2 through a prism 70 and a biconvex lens 71. The intensified picture appearing on the phosphor screen 22 of the converter is radiated by a mirror 51 positioned at 45° to the axis of the image converter, in vertical upward direction through a reversing lens 56 into a double prism 72. This prism reverses the light paths by 180° and projects it into a first ocular lens 33a, and from there to a second ocular lens 33b, by deflecting it about a right angle by means of a right-angle prism 73. Through the ocular the light enters the pupil 41 of the viewer's eye. Focusing of the image is achieved by changing the axial position of the reversing lens 56.

The path of the light passing through the viewer is, in principle, identical with that shown and described in the diagram of FIG. 2; but whereas the light path in the diagram lies in one horizontal plane, the light path in the optical instrument depicted in FIGS. 3 and 4 lies in a vertical plane which is perpendicular to the viewing axis. The advantages are obvious, since the axial dimension of the instrument is relatively short, and the light rays do not cross in any place as happens in the theoretical instrument of the diagram.

A large number of variations are possible for attaining the same subject: depending on the size of the photoemissive cathode and the phosphor screen, the size of the intermediate image may be enlarged or reduced by positioning the lens 56 at an appropriate distance between the mirrors 52 and 53. On the other hand, the size of the intermediate image depends on the magnification of the ocular which permits an endless number of parameter variations. In order to provide a light-weight, confortable instrument it is, of course, imperative to reduce the distance between the several components to a minimum without, however, reducing the intensity and clarity of the image. Therefore, the distance D between the main mirror 31 and the eye-lens should be kept as short as the length of the ocular permits. On the other hand, the photo-emissive cathode opening should be of a size sufficient for receiving a maximum of light energy. This requirement determines the distance between the lens 32 and the photo-emissive cathode, while the distance D is governed by the size and optical properties of the ocular.

The same considerations apply to the use of prisms instead of mirrors. When glass fibers are used for transferring the image from the phosphor screen to a plane in front of the ocular coinciding with its focus, it is evident that the size of the image remains unaltered, and that the ocular must be so designed as to project the object O into the eye at the correct angle $\theta$.

In the foregoing, the image converter was shown and described to consist of a photo-emissive cathode at its front end, a phosphor screen at its rear end, and an electrostatic lens system interposed between the two. It is, however, understood that the image converter may undergo various modifications in view of the progress made in the art: it is, for instance, proposed to replace the electrostatic lens system by a micro-channel plate of known design.

It is also proposed to use other means for converting and/or intensifying the image such as vidicon camera tube, charge-couple devices or other known systems of image plane technology.

The image may also be processed by electronic devices, with a view to enhancing contrasts, reducing noise and to adding alphanumeric information and symbols. With these devices the processed image is transferred onto a phosphor screen of a cathode ray tube and projected into the eyes of the viewer by means of the aforedescribed components of the instrument.

Figure 5:
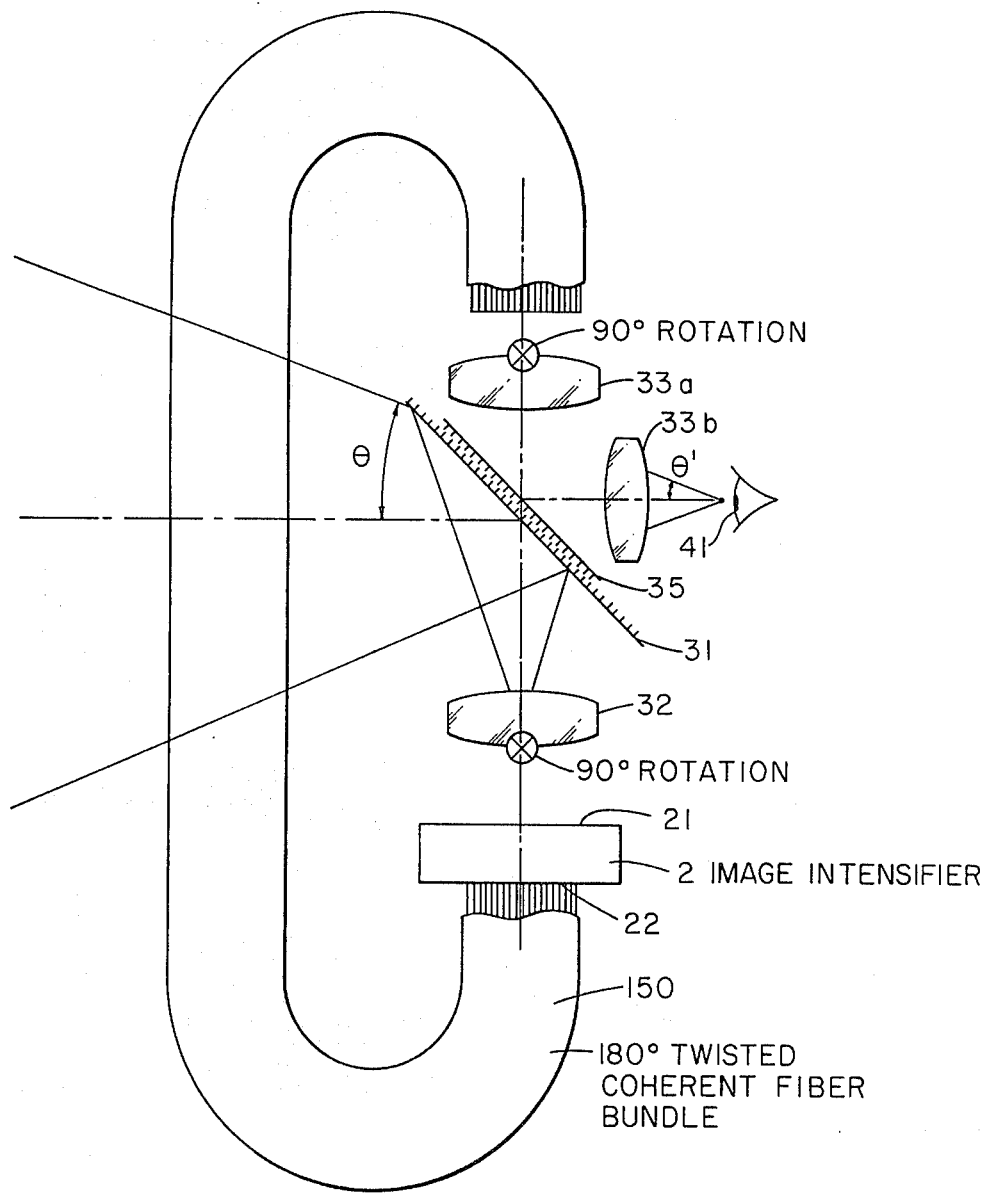
FIG. 5 is a diagrammatic showing of a fiber optic embodiment.

FIG. 5 illustrates, in diagrammatic form, an embodiment wherein optical fibers, 150, are utilized to transfer the image from the phosphor screen 22 of the image intensifier, 2, into the focal plane of a first lens, 33a, of the ocular. From this lens, 33a, the light path is deflected about a right angle by the angularly positioned mirror, 35, into a second ocular lens, 33b, which concentrates the light rays into the pupil, 41, of the observer. The input mirror, 31, the image intensifier, 2, and the objective lens system, 32, projecting the light received from the viewed object into the photo-cathode, 21, of the intensifier, are identical with the components of the instrument illustrated in FIG. 2, and are denoted by the same numerals.

It will be understood that other optical components may be used in a fiber-optics instrument as long as the distance between the optical center of the mirror, 35 and the eye lens, 41, equals the distance between the optical center of the mirror, 31, and the optical center of the objective lens, 32. In order to position the optical centers of the two mirrors as close as possible it is proposed to provide these in the form of a double-sided mirror.

While the invention has been described in detail above, it is to be understood that this detailed description is by way of example only, and the protection granted is to be limited only within the spirit of the invention and the scope of the following claims.

I claim:

1. A night-vision instrument comprising an ocular defining the axis of vision of the instrument along which light from the instrument enters the eye of a user; an input mirror; an objective lens and an image intensifier having a phosphor screen and a photocathode in spaced-apart relationship coaxial therewith; optical means to transfer the image appearing on said phosphor secreen onto the focal plane of said ocular; said objective lens and said image intensifier being positioned at a right angle to said axis of vision as it enters a user's eye, said input mirror being positioned with its optical center on said axis of vision at an angle of 45° to said axis of vision in such a manner as to reflect the image of the viewed object through the objective lens onto said photocathode of said image intensifier, the distance between the optical center of said input mirror and the pupil of the eye of a user equalling the distance between said mirror center and the optical center of said objective lens, and the optical means being so dimensioned as to cause the image to appear to the eye of a user at the same visual angle as if viewed from the same distance by the unaided eye.

2. The night-vision instrument as defined in claim 1, wherein said optical means is in the form of a bundle of light-transmitting fibers, first ends of all of said fibers lying in a plane adjoining said phosphor screen, and their other ends lying in the plane of an intermediate image on the side of said ocular opposite the side thereof facing the user's eye.

3. The night-vision instrument as defined in claim 1, wherein said optical means is in the form of a mirror system interposed between said phosphor screen and said ocular, said mirror system comprising a first mirror positioned to the rear of said input mirror facing said ocular and having its suface parallel to the surface of said input mirror, said mirror system further comprising a set of four mirrors, each set a right angle to the plane of the adjacent mirror of said set and inclined at an angle of 45° to the axis of vision, the four mirrors being positioned in a manner designed to reflect the image from said phosphor screen onto said first mirror.

4. The night-vision instrument as defined in claim 3, wherein a biconvex lens is positioned between two adjacent mirrors of said set of mirrors.

5. The night-vision instrument as defined in claim 3, wherein a vision diaphragm is positioned in the plane of an intermediate image in front of the ocular.

6. The night-vision instrument as defined in claim 1, wherein said optical means comprises a first mirror positioned to the rear of said input mirror facing said ocular and having its surface parallel to the surface of said input mirror, and a double prism positioned between said phosphor screen and said first mirror in a manner designed to reflect the image from the phosphor screen onto said first mirror.

7. The night-vision instrument as defined in claim 1, wherein said image intensifier comprises a semitransparent photo-emissive cathode at its front end, a phosphor screen positioned at its rear end, and an electrostatic lens system inserted between said cathode and said phosphor screen.

8. The night-vision instrument as defined in claim 1, wherein said image intensifier comprises a semitransparent photo-emissive cathode at its front end, a phosphor screen at its rear end, and a micro-channel plate inserted between said cathode and said phosphor screen.

9. The night-vision instrument as defined in claim 1, wherein said image intensifier is in the form of a vidicon camera tube.

10. The night-vision instrument as defined in claim 1, wherein said image intensifier is in the form of a charge-couple device.

11. The night-vision instrument as defined in claim 1, wherein said optical means is in the form of a mirror system interposed between said phosphor screen and said ocular, said mirror system comprising a first mirror positioned to the rear of said input mirror facing said ocular and having its surface parallel to the surface of said input mirror, and said mirror system further comprising four mirrors positioned in a manner designed to fold said axis of vision by 360° back to said first mirror close to a point of incidence of said axis of vision onto said input mirror.

12. The night-vision instrument as defined in claim 11, wherein a lens system is positioned between said image intensifier and said ocular, adapted to invert the image.

13. The night-vision instrument as defined in claim 11, wherein a vision diaphragm is positioned in the plane of an intermediate image in front of the ocular.

* * * * *